(12) United States Patent
Matsumoto

(10) Patent No.: US 10,246,601 B2
(45) Date of Patent: Apr. 2, 2019

(54) COLORED MICROPARTICLE DISPERSION

(71) Applicant: KAO CORPORATION, Tokyo (JP)

(72) Inventor: Yuuta Matsumoto, Wakayama (JP)

(73) Assignee: KAO CORPORATION, Tokyo (JP)

(*) Notice: Subject to any disclaimer, the term of this patent is extended or adjusted under 35 U.S.C. 154(b) by 0 days.

(21) Appl. No.: 15/832,402

(22) Filed: Dec. 5, 2017

(65) Prior Publication Data

US 2018/0094159 A1 Apr. 5, 2018

Related U.S. Application Data

(62) Division of application No. 15/103,355, filed as application No. PCT/JP2014/081794 on Dec. 1, 2014, now Pat. No. 9,879,148.

(30) Foreign Application Priority Data

Dec. 16, 2013 (JP) ................ 2013-259124

(51) Int. Cl.
C09D 17/00 (2006.01)
C09D 11/326 (2014.01)
C09D 11/322 (2014.01)
C09D 11/106 (2014.01)
C09B 67/46 (2006.01)

(52) U.S. Cl.
CPC .......... C09D 17/001 (2013.01); C09B 67/009 (2013.01); C09D 11/106 (2013.01); C09D 11/322 (2013.01); C09D 11/326 (2013.01); C09D 17/00 (2013.01)

(58) Field of Classification Search
CPC .... C09D 17/001; C09D 11/106; C09D 17/00; C09D 11/326; C09B 67/009; C08D 11/322
USPC ....................................... 524/852
See application file for complete search history.

(56) References Cited

U.S. PATENT DOCUMENTS

2003/0195274 A1 10/2003 Nakamura et al.
2004/0048963 A1 3/2004 Sawada et al.
2004/0229974 A1 11/2004 Miyabayashi
2010/0245416 A1 9/2010 Ohshima et al.
2013/0231439 A1* 9/2013 Wolfe .................... B82Y 30/00
524/533

FOREIGN PATENT DOCUMENTS

| JP | 57-126888 A | 8/1982 |
|---|---|---|
| JP | 2000-178245 A | 6/2000 |
| JP | 2002-80506 A | 3/2002 |
| JP | 2002-179642 A | 6/2002 |
| JP | 2003-261605 A | 9/2003 |
| JP | 2003-306611 A | 10/2003 |
| JP | 2003-327862 A | 11/2003 |
| JP | 2004-256776 A | 9/2004 |
| JP | 2005-97517 A | 4/2005 |
| JP | 2006-241303 A | 9/2006 |
| JP | 2006241303 A * | 9/2006 |
| JP | 2006-341142 A | 12/2006 |
| JP | 2008-260279 A | 10/2008 |

OTHER PUBLICATIONS

International Search Report for PCT/JP2014/081794 dated Mar. 3, 2015.

* cited by examiner

Primary Examiner — Hui H Chin
(74) Attorney, Agent, or Firm — Birch, Stewart, Kolasch & Birch, LLP

(57) ABSTRACT

A colored fine particle dispersion including emulsified particles including a pigment and a polymer containing a constitutional unit derived from a compound (A) represented by formula (I) and a constitutional unit derived from a polymerizable monomer component including a hydrophobic vinyl-based monomer:

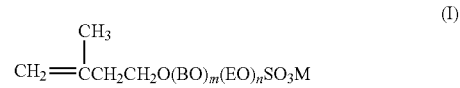

(I)

wherein BO is a butyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25; a process for producing the colored fine particle dispersion; a water-based ink for ink-jet printing including the colored fine particle dispersion; and a use of the colored fine particle dispersion as a colorant for a water-based ink for ink-jet printing.

18 Claims, No Drawings

COLORED MICROPARTICLE DISPERSION

CROSS-REFERENCE TO RELATED APPLICATIONS

This application is a Divisional of co-pending application Ser. No. 15/103,355 filed on Jun. 10, 2016, which is a National Phase of PCT International Application No. PCT/JP2014/081794 filed on Dec. 1, 2014, which claims priority under 35 U.S.C. § 119(a) to Patent Application No. 2013-259124 filed in Japan on Dec. 16, 2013. All of the above applications are hereby expressly incorporated by reference into the present application.

FIELD OF THE INVENTION

The present invention relates to a colored fine particle dispersion, a process for producing the colored fine particle dispersion, an ink for ink-jet printing which includes the colored fine particle dispersion, and a use of the colored fine particle dispersion as a colorant for a water-based ink for ink-jet printing.

BACKGROUND OF THE INVENTION

In ink-jet printing methods, droplets of ink are directly projected onto a recording medium from very fine nozzles and allowed to adhere to the recording medium to form characters or images. The ink-jet printing methods have become rapidly spread because of various advantages such as easiness of full coloration, low cost, capability of using a plain paper as the recording medium, non-contact with printed characters or images, etc. In recent years, in order to impart good weathering resistance and good water resistance to printed materials, an ink containing a pigment as a colorant has been extensively used.

On the other hand, it has been required to print characters or images on recording media for commercial printing purposes using a low-liquid absorbing coated paper such as an offset-coated paper, or a non-liquid absorbing resin film such as a polyvinyl chloride resin film, a polypropylene resin film and a polyester resin film.

It is known that when characters or images are printed on the low-liquid absorbing or non-liquid absorbing recording media by the ink-jet printing methods, there tends to occur problems such as prolonged drying time owing to slow or no absorption of liquid components, and deterioration in rub fastness early after printing. Also, it is known that unlike a plain paper in which a pigment is likely to be penetrated, the low-liquid absorbing or non-liquid absorbing recording media tend to suffer from deposition of pigment particles remaining thereon which are directly susceptible to an external force, so that the characters or images printed on these recording media tend to be deteriorated in rub fastness even after being dried.

In order to solve these conventional problems, ink-jet printing methods using recording media having an ink-absorbing layer have been proposed.

For example, JP 2008-260279A discloses an ink-jet printing method using a recording medium having a pigment-containing coating layer in which an amount of pure water transferred to a surface of the recording medium on which the coating layer is provided, and a pH value of the same surface of the recording medium are controlled to respective specific ranges, and characters or images are printed on such a surface of the recording medium using an ink containing a granular coloring material, an emulsion resin and a surfactant and having a pH value of not less than 8. In addition, JP 2008-260279A proposes a recording apparatus equipped with a drying device.

However, the improvement in recording media and recording apparatus tends to pose problems concerning costs, consumed power, etc., and it has been therefore required to improve the composition of inks.

Further, for the purpose of stably compounding a pigment into a water-based ink, colored fine particles prepared by encapsulating the pigment with a polymer have been developed.

For example, JP 2003-306611A discloses a microencapsulated pigment capable of producing an ink for ink-jet printing which can satisfy all of requirements (1) to (6) including (1) excellent dispersion stability; (2) excellent ejection stability from a print head; (3) capability of procuring printed materials having images with excellent fastness; (4) capability of procuring printed materials having images with high optical density; (5) capability of procuring printed materials having images with excellent scratch resistance; and (6) capability of procuring printed materials having images with high color developability which hardly suffer from ink bleeding even when using a plain paper as a recording medium. The microencapsulated pigment includes pigment particles that are coated with a polymer having a repeating constitutional unit derived from a polymerizable surfactant containing a hydrophilic group, a hydrophobic group and a polymerizable group.

In addition, JP 2003-261605A discloses a sulfuric acid salt containing an alkylene group having 5 to 18 carbon atoms or an alkoxymethylethylene group, and an alkylene group having 2 to 4 carbon atoms, as a polymerizable surfactant capable of providing a polymer emulsion that is kept stable during polymerization thereof and provides a polymer coating film having good properties such as water resistance. The polymer emulsion described in Patent Literature 3 can be used as a paint or an adhesive in the form of the polymer coating film.

SUMMARY OF THE INVENTION

The present invention relates to the following aspects [1] to [4].

[1] A colored fine particle dispersion including emulsified particles including a pigment and a polymer containing a constitutional unit derived from a compound (A) represented by the following general formula (I) and a constitutional unit derived from a polymerizable monomer component including a hydrophobic vinyl-based monomer:

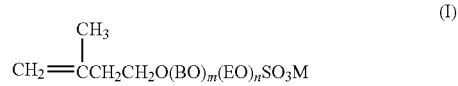

$$CH_2=\overset{CH_3}{\underset{|}{C}}CH_2CH_2O(BO)_m(EO)_nSO_3M \quad (I)$$

wherein BO is a butyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25.

[2] A process for producing the colored fine particle dispersion according to the above aspect [1], including the step of conducting emulsion polymerization in the presence of the pigment, the compound (A) represented by the aforementioned general formula (I), and the polymerizable monomer component including the hydrophobic vinyl-based monomer.

[3] A water-based ink for ink-jet printing, including the colored fine particle dispersion according to the above aspect [1].

[4] A use of the colored fine particle dispersion according to the above aspect [1] as a colorant for a water-based ink for ink-jet printing.

DETAILED DESCRIPTION OF THE INVENTION

In the aforementioned conventionally known technologies, although the inks have good storage stability, there tend to occur the problems including not only rapid increase in viscosity of the inks when the inks are dried and concentrated owing to removal of water contained therein, but also unstable ejection properties owing to residual inks in nozzles and insufficient rub fastness when printed on a recording medium that hardly absorbs water.

The present invention relates to a colored fine particle dispersion used for a water-based ink for ink-jet printing which is excellent in storage stability as well as rub fastness when printed on a low-water absorbing recording medium, and can be prevented from suffering from increase in viscosity when concentrated, a process for producing the colored fine particle dispersion, a water-based ink including the colored fine particle dispersion, and a use of the colored fine particle dispersion as a colorant for a water-based ink for ink-jet printing.

Meanwhile, the term "low water absorption" as used in the present invention is intended to mean both concepts of low liquid absorption and non-liquid absorption.

The present inventors have found that the aforementioned conventional problems can be solved by a colored fine particle dispersion including emulsified particles including a pigment and a polymer containing a constitutional unit derived from a polymerizable surfactant having a specific structure and a constitutional unit derived from a polymerizable monomer component including a hydrophobic vinyl-based monomer.

That is, the present invention relates to the following aspects [1] to [4].

[1] A colored fine particle dispersion including emulsified particles including a pigment and a polymer containing a constitutional unit derived from a compound (A) represented by the following general formula (I) and a constitutional unit derived from a polymerizable monomer component including a hydrophobic vinyl-based monomer:

(I)

wherein BO is a butyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25.

[2] A process for producing the colored fine particle dispersion according to the above aspect [1], including the step of conducting emulsion polymerization in the presence of the pigment, the compound (A) represented by the aforementioned general formula (I), and the polymerizable monomer component including the hydrophobic vinyl-based monomer.

[3] A water-based ink for ink-jet printing, including the colored fine particle dispersion according to the above aspect [1].

[4] A use of the colored fine particle dispersion according to the above aspect [1] as a colorant for a water-based ink for ink-jet printing.

In accordance with the present invention, there are provided a colored fine particle dispersion used for a water-based ink for ink-jet printing which is excellent in storage stability as well as rub fastness when printed on a low-water absorbing recording medium, and can be prevented from suffering from increase in viscosity when concentrated; a process for producing the colored fine particle dispersion; a water-based ink including the colored fine particle dispersion, and a use of the colored fine particle dispersion as a colorant for a water-based ink for ink-jet printing.

[Colored Fine Particle Dispersion]

The colored fine particle dispersion according to the present invention includes emulsified particles including a pigment and a polymer containing a constitutional unit derived from a compound (A) represented by the following general formula (I) and a constitutional unit derived from a polymerizable monomer component including a hydrophobic vinyl-based monomer. The pigment is preferably coated with the aforementioned polymer. Meanwhile, in the present invention, the compound (A) represented by the following general formula (I) may also be referred to merely as a "compound (A)".

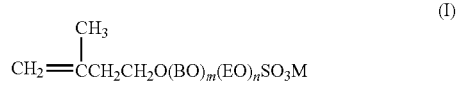

(I)

wherein BO is a butyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25.

The emulsified particles as used in the present invention mean colored fine particles that include a pigment and a polymer containing a constitutional unit derived from a compound (A) represented by the aforementioned general formula (I) and a constitutional unit derived from a polymerizable monomer component including a hydrophobic vinyl-based monomer, which are produced by conducting emulsion polymerization in a dispersing medium containing water as a main component in the presence of the pigment, the compound (A) represented by the aforementioned general formula (I) and the polymerizable monomer component including the hydrophobic vinyl-based monomer. This definition is hereinafter applied in the same way.

In accordance with the present invention, it is possible to provide a colored fine particle dispersion that is excellent in storage stability as well as rub fastness when printed on a low-water absorbing recording medium, and can be prevented from suffering from increase in viscosity when concentrated. The reason therefor is considered as follows, though it is not clearly determined.

That is, since the low-water absorbing recording medium is hardly wetted with water as compared with a paper medium, it is necessary to incorporate a low-polarity solvent into a water-based ink. For this reason, there tends to occur such a problem that the ink is deteriorated in storage stability. In consequence, by incorporating the pigment and a high-molecular polymer containing the compound (A) as a constitutional unit thereof in the colored fine particle dispersion, the constitutional unit derived from the hydrophobic vinyl-based monomer which constitutes the polymer, and the hydrocarbon group and butyleneoxy group derived from the compound (A) are adsorbed to the pigment and the other moieties of the polymer to form a hydrophobic phase. In addition, by orienting the ethyleneoxy group and sulfonic group of the compound (A) in a hydrophilic phase, stable pigment-containing emulsified particles (colored fine particles) are produced, so that the resulting ink is enhanced in storage stability. Further, even when water is removed by evaporation from the water-based ink, aggregation of the pigment-containing emulsified particles (colored fine particles) is suppressed since the ethyleneoxy group of the compound (A) also has a high affinity to the low-polarity solvent. As a result, it is considered that the ink is prevented from suffering from increase in viscosity when concentrated. Furthermore, it is considered that by using the compound (A) containing a butyleneoxy chain as a hydrophobic group having a large molecular weight, the polymer is hardly desorbed from a surface of the pigment having a high hydrophobicity, and a high-strength film of the ink containing the pigment and the polymer can be formed in cooperation with an interaction of the polymers among themselves, so that the resulting ink can exhibit a high rub fastness.

(Pigment)

The pigment used in the present invention may be either an inorganic pigment or an organic pigment.

Examples of the inorganic pigment include carbon blacks and metal oxides. In particular, carbon blacks are preferably used for black inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of the organic pigment used in the present invention is not particularly limited, and there may be used any chromatic color pigment having a yellow color, a magenta color, a cyan color, a red color, a blue color, an orange color, a green color, etc.

The pigment used in the present invention is preferably a pigment subjected to no hydrophilic treatment from the viewpoint of uniformly coating the surface of the pigment with the polymer. Meanwhile, the hydrophilic treatment of the pigment as used herein means the treatment in which at least one anionic or cationic hydrophilic functional group is bonded onto the surface of the pigment either directly or through the other atom group. Examples of the other atom group used above include an alkanediyl group having 1 to 24 carbon atoms, a substituted or unsubstituted phenylene group and a substituted or unsubstituted naphthylene group.

Examples of the anionic hydrophilic functional group include an acid group such as a carboxy group ($-COOM^1$), a sulfonic acid group ($-SO_3M^1$), a phosphoric acid group ($-PO_3M^1{}_2$), $-SO_2NH_2$, $-SO_2NHCOR^1$ and dissociated ion forms of these groups ($-COO^-$, $-SO_3^-$, $-PO_3^{2-}$, $-PO_3^-M^1$, etc.), wherein $M^1$ is a hydrogen atom, an alkali metal, ammonium or organic ammonium, and $R^1$ is an alkyl group having 1 to 12 carbon atoms, a phenyl group or a naphthyl group.

Examples of the cationic hydrophilic functional group include an ammonium group, an amino group, etc.

(Polymer)

The polymer used in the present invention is obtained by polymerizing the compound (A) and the polymerizable monomer component including the hydrophobic vinyl-based monomer. The polymer is preferably obtained by polymerizing the compound (A) and the polymerizable monomer component in the presence of the pigment from the viewpoint of coating the pigment with the polymer.

(Compound (A) Represented by Formula (I))

The compound (A) used in the present invention is represented by the following general formula (I):

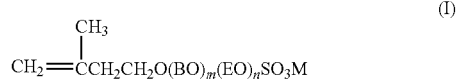

wherein BO is a butyleneoxy group; and EO is an ethyleneoxy group.

Examples of the butyleneoxy group include a butane-1,2-diyloxy group, a butane-1,3-diyloxy group and a tetramethyleneoxy group. Of these butyleneoxy groups, preferred is a butane-1,2-diyloxy group.

The symbol m in the general formula (I) represents an average molar number of addition of the butyleneoxy group, and is a number of not less than 1, preferably not less than 2, more preferably not less than 3, and even more preferably not less than 4, and is also a number of not more than 10, preferably not more than 9, more preferably not more than 8, and even more preferably not more than 7.

The symbol n in the general formula (I) represents an average molar number of addition of the ethyleneoxy group, and is a number of not less than 4, preferably not less than 5, more preferably not less than 7, even more preferably not less than 9, and further even more preferably not less than 11, and is also a number of not more than 25, preferably not more than 23, more preferably not more than 21, and even more preferably not more than 19.

In the formula (I), $(BO)_m$ and $(EO)_n$ are block-bonded to each other in this order.

In the formula (I), M represents a cation. As the cation represented by M, there may be mentioned at least one cation selected from the group consisting of alkali metal ions such as lithium, sodium and potassium; alkali earth metal ions such as calcium and magnesium; ammonium; and organic ammoniums having a group such as a monomethyl ammonium group, a dimethyl ammonium group, a trimethyl ammonium group, a monoethyl ammonium group, a diethyl ammonium group, a triethyl ammonium group, a monomethanol ammonium group, a dimethanol ammonium group and a triethanol ammonium group. Of these cations, from the viewpoint of attaining good stability of the colored fine particle dispersion, monovalent cations are preferred, and ammonium is more preferred.

The compound (A) represented by the formula (I) may be produced by known methods, for example, by adding 1,2-butyleneoxide to 3-methyl-3-butene-1-ol and then adding ethyleneoxide to the obtained reaction product to obtain an ether alcohol, sulfating the obtained ether alcohol using a sulfating agent, and neutralizing the sulfated product with a basic substance. Examples of the sulfating agent include chlorosulfonic acid, sulfuric anhydride and amidosulfuric acid. Of these sulfating agents, from the viewpoints of suppressing side reactions such as an addition reaction of the sulfuric acid group to the double bond group and an isomerization reaction of the double bond group, the amidosulfuric acid group is preferably used.

The content of the constitutional unit derived from the compound (A) in the polymer is preferably not less than 3 parts by mass, more preferably not less than 4 parts by mass, and even more preferably not less than 5 parts by mass, and is also preferably not more than 30 parts by mass, more preferably not more than 25 parts by mass, even more preferably not more than 20 parts by mass, further even more preferably not more than 15 parts by mass, and further even more preferably not more than 12 parts by mass, in terms of the monomer, on the basis of 100 parts by mass of the constitutional unit derived from the polymerizable monomer component, from the viewpoints of improving storage stability and rub fastness when printed on a low-water absorbing recording medium, and suppressing increase in viscosity of the resulting ink when concentrated.

(Polymerizable Monomer Component Including Hydrophobic Vinyl-Based Monomer)

The polymerizable monomer component used in the present invention includes the hydrophobic vinyl-based monomer. Meanwhile, the term referred to merely as a "polymerizable monomer component" as used in the present invention is intended to mean the monomer excluding the compound (A). However, in the actual emulsion polymerization, the compound (A) may be incorporated into the polymer by copolymerizing with the polymerizable monomer component.

The term "hydrophobic" of the hydrophobic vinyl-based monomer as used in the present invention means that the amount of the monomer that can be dissolved in 100 g of ion-exchanged water as measured at 25° C. is less than 10 g.

As the hydrophobic vinyl-based monomer, there may be mentioned those compounds containing a hydrophobic group and a polymerizable group in their structure. Examples of the hydrophobic group include at least one group selected from the group consisting of an aliphatic hydrocarbon group, an alicyclic hydrocarbon group and an aromatic hydrocarbon group. Examples of the polymerizable group include a vinyl group, an allyl group, an acryloyl group, a methacryloyl group, a propenyl group, a vinylidene group and a vinylene group.

Examples of the hydrophobic vinyl-based monomer include at least one compound selected from the group consisting of a (meth)acrylic acid ester and an aromatic ring-containing hydrophobic monomer.

The term "(meth)acrylic acid ester" as used herein means at least one compound selected from the group consisting of an acrylic acid ester and a methacrylic acid ester, and the term "(meth)" as described hereinafter has the same meaning as defined above.

Specific examples of the (meth)acrylic acid ester include acrylic acid esters containing an alkyl group having not less than 1 and not more than 10 carbon atoms and preferably not less than 1 and not more than 8 carbon atoms, such as methyl acrylate, ethyl acrylate, propyl acrylate and 2-ethylhexyl acrylate; and methacrylic acid esters containing an alkyl group having not less than 1 and not more than 10 carbon atoms and preferably not less than 1 and not more than 8 carbon atoms, such as methyl methacrylate, ethyl methacrylate, propyl methacrylate and 2-ethylhexyl methacrylate.

Of these (meth)acrylic acid esters, preferred is at least one compound selected from the group consisting of methyl acrylate, ethyl acrylate, methyl methacrylate, ethyl methacrylate, 2-ethylhexyl acrylate and 2-ethylhexyl methacrylate.

As the aromatic ring-containing hydrophobic monomer, there may be mentioned a styrene-based monomer, an aromatic group-containing (meth)acrylate, etc.

Examples of the styrene-based monomer include styrene, 2-methyl styrene, etc. Examples of the aromatic group-containing (meth)acrylate include benzyl (meth)acrylate, phenoxyethyl (meth)acrylate, etc. Of these compounds, preferred are styrene and benzyl (meth)acrylate.

The content of the hydrophobic monomer in the polymerizable monomer component is preferably not less than 70% by mass, more preferably not less than 80% by mass, even more preferably not less than 90% by mass, and further even more preferably not less than 93% by mass, and is also preferably not more than 100% by mass, more preferably not more than 99% by mass, and even more preferably not more than 98% by mass, from the viewpoint of improving dispersion stability of the colored fine particle dispersion as well as storage stability and ejection properties of the resulting ink.

The polymerizable monomer component preferably contains an ionic monomer. Examples of the ionic monomer include anionic monomers such as carboxylic acid monomers, sulfonic acid monomers and phosphoric acid monomers, and cationic monomers.

Specific examples of the carboxylic acid monomers include (meth)acrylic acid, crotonic acid, itaconic acid, maleic acid, fumaric acid, citraconic acid and 2-methacryloyloxymethylsuccinic acid. Specific examples of the sulfonic acid monomers include styrenesulfonic acid, 2-acrylamido-2-methylpropanesulfonic acid and 3-sulfopropyl (meth)acrylate. Specific examples of the phosphoric acid monomers include vinylphosphonic acid, vinyl phosphate, bis(methacryloxyethyl)phosphate, diphenyl-2-acryloyloxyethyl phosphate and diphenyl-2-methacryloyloxyethyl phosphate.

Among these ionic monomers, preferred are the carboxylic acid monomers, more preferred is (meth)acrylic acid, and even more preferred is methacrylic acid.

The content of the ionic monomer in the polymerizable monomer component is preferably not less than 0% by mass, more preferably not less than 0.1% by mass, even more preferably not less than 1% by mass, and further even more preferably not less than 2% by mass, and is also preferably not more than 20% by mass, more preferably not more than 15% by mass, even more preferably not more than 10% by mass, and further even more preferably not more than 7% by mass, form the viewpoint of improving dispersion stability of the colored fine particle dispersion as well as storage stability and ejection properties of the resulting ink.

The polymerizable monomer component may further contain the other monomer, if required. Examples of the monomer include polyethylene glycol mono(meth)acrylate, methoxy polyethylene glycol mono(meth)acrylate, octoxy polyethylene glycol mono(meth)acrylate and stearoyloxy polyethylene glycol mono(meth)acrylate.

Specific examples of the commercially available products of these monomers include "NK ESTER M-90G", "NK ESTER M-230G", "NK ESTER M-450G" and "NK ESTER M-900G" all available from Shin-Nakamura Chemical Co., Ltd., and "LIGHT ESTER 041MA" available from Kyoeisha Chemical Co., Ltd.

(Emulsified Particles (Colored Fine Particles))

The colored fine particle dispersion according to the present invention is in the form of a dispersion prepared by dispersing the emulsified particles (colored fine particles) including the pigment and the polymer containing the constitutional unit derived from the compound (A) and the constitutional unit derived from the polymerizable monomer component including the hydrophobic vinyl-based monomer (hereinafter also referred to merely as "emulsified particles") in a dispersing medium containing water as a main medium. In this case, the configuration of the emulsified particles is preferably composite particles formed by coating at least the pigment with the polymer. Examples of the configuration of the emulsified particles include the particle configuration in which the pigment is enclosed within the respective polymer particles, the particle configuration in which the pigment is uniformly dispersed in the respective polymer particles, the particle configuration in which the pigment is exposed onto a surface of the respective polymer particles, and the like. The polymer may be produced by subjecting the compound (A) and the polymerizable monomer component to emulsion polymerization, and is preferably obtained by the below-mentioned production process.

The content (solid content) of the emulsified particles in the colored fine particle dispersion is preferably not less than 10% by mass, more preferably not less than 15% by mass, even more preferably not less than 20% by mass, and further even more preferably not less than 25% by mass, and is also preferably not more than 60% by mass, more preferably not more than 55% by mass, and even more preferably not more than 50% by mass, form the viewpoint of stably dispersing the emulsified particles.

The content of the pigment in the colored fine particle dispersion is preferably not less than 1.0% by mass, more preferably not less than 3.0% by mass, and even more preferably not less than 5.0% by mass, and is also preferably not more than 40% by mass, more preferably not more than 30% by mass, even more preferably not more than 20% by mass, and further even more preferably not more than 15% by mass, form the viewpoint of improving optical density of the resulting ink.

The content of the polymer in the colored fine particle dispersion is preferably not less than 1.0% by mass, more preferably not less than 5.0% by mass, and even more preferably not less than 15% by mass, and is also preferably not more than 50% by mass, more preferably not more than 40% by mass, and even more preferably not more than 30% by mass, form the viewpoint of improving rub fastness of the printed characters or images.

The mass ratio of the pigment to the polymer [pigment/polymer] in the colored fine particle dispersion is preferably not less than 0.1, more preferably not less than 0.2, and even more preferably not less than 0.4, and is also preferably not more than 4.0, more preferably not more than 2.0, and even more preferably not more than 1.0, form the viewpoints of suppressing increase in viscosity of the resulting water-based ink when concentrated, enhancing optical density of the water-based ink when printed on a low-water absorbing recording medium, and improving storage stability of the water-based ink.

The weight-average molecular weight of the polymer included in the colored fine particle dispersion is preferably not less than 10,000 and not more than 1,200,000, from the viewpoint of improving dispersion stability of the colored fine particle dispersion. Meanwhile, the weight-average molecular weight of the polymer may be measured by GPC method using monodisperse polystyrene having a known molecular weight as a reference standard substance.

The average particle size of the emulsified particles in the colored fine particle dispersion is preferably not less than 10 nm, more preferably not less than 30 nm, even more preferably not less than 40 nm, further even more preferably not less than 50 nm, further even more preferably not less than 60 nm, further even more preferably not less than 75 nm, and further even more preferably not less than 80 nm, and is also preferably not more than 300 nm, more preferably not more than 160 nm, even more preferably not more than 150 nm, further even more preferably not more than 140 nm, and further even more preferably not more than 130 nm, from the viewpoints of improving adsorption of the polymer to the pigment and accelerating neutralization of the polymer to enhance dispersion stability of the emulsified particles in the colored fine particle dispersion, and as a result, preventing formation of coarse particles, suppressing increase in viscosity of the ink when concentrated, and improving rub fastness of the printed characters or images when printed on a low-water absorbing recording medium.

Meanwhile, the average particle size of the emulsified particles may be measured by the method described in Examples below.

(Neutralizing Agent)

In the present invention, from the viewpoint of improving dispersion stability of the emulsified particles (colored fine particles) as well as storage stability of the resulting water-based ink, a neutralizing agent may be used, if required. When using the neutralizing agent, the pH value of the colored fine particle dispersion is preferably controlled to not less than 7, and more preferably not less than 7.5, and is also preferably controlled to not more than 11, and more preferably not more than 9.5.

Examples of the neutralizing agent include hydroxides of alkali metals, ammonia and organic amines.

Specific examples of the hydroxides of alkali metals include lithium hydroxide, sodium hydroxide, potassium hydroxide and cesium hydroxide. Among these hydroxides of alkali metals, preferred is sodium hydroxide.

Specific examples of the organic amines include trimethylamine, ethylamine, diethylamine, triethylamine and triethanolamine.

The neutralizing agent or the neutralizing agent aqueous solution may be used alone or in the form of a mixture of any two or more kinds thereof.

[Process for Producing Colored Fine Particle Dispersion]

From the viewpoint of coating the pigment with the polymer, the colored fine particle dispersion is preferably produced by the process including the step of conducting emulsion polymerization in the presence of the pigment, the compound (A) represented by the general formula (I), and the polymerizable monomer component including the hydrophobic vinyl-based monomer.

The pigment used in the above production process is preferably a pigment subjected to no hydrophilic treatment, from the viewpoint of uniformly coating the surface of the pigment with the polymer. When using the pigment subjected to no hydrophilic treatment, it is considered that the polymer produced upon the emulsion polymerization is likely to be adsorbed onto the surface of the respective pigment particles, so that it becomes possible to produce the colored fine particle dispersion containing the emulsified particles (colored fine particles) which are formed by more uniformly coating the pigment with the polymer.

The colored fine particle dispersion according to the present invention is preferably produced by the following steps 1 and 2:

step 1: subjecting a mixed solution containing the pigment, the compound (A) represented by the general formula (I) and water to dispersion treatment to obtain a dispersion 1; and step 2: mixing the dispersion 1 and the polymerizable monomer component including the hydrophobic vinyl-based monomer and subjecting the resulting mixture to emulsion polymerization.

(Step 1)

In the step 1, the mixed solution containing the pigment, the compound (A) represented by the formula (I) and water is subjected to dispersion treatment to obtain a dispersion 1.

The amount of the compound (A) represented by the formula (I) which is added in the step 1 is preferably not less than 1% by mass, more preferably not less than 5% by mass, and even more preferably not less than 8% by mass, and is also preferably not more than 50% by mass, more preferably not more than 30% by mass, and even more preferably not more than 20% by mass, on the basis of the pigment. When the amount of the compound (A) added is not less than 1% by mass, the pigment is excellent in dispersibility, so that it is possible to obtain a uniform pigment dispersion (dispersion 1) containing pigment particles having a small particle size. When the amount of the compound (A) added is not more than 30% by mass, formation of particles constituted of only a polymer on which no pigment is adsorbed can be suppressed, so that the resulting ink can be prevented from suffering from increase in viscosity when concentrated.

The dispersing medium may contain, in addition to water, an optional organic solvent.

Examples of the organic solvent usable in the dispersing medium include alcohols having not less than 1 and not more than 6 carbon atoms, ketones, ethers, amides, aromatic hydrocarbons, and aliphatic hydrocarbons having not less than 5 and not more than 10 carbon atoms. Of these organic solvents, from the viewpoint of attaining good dispersion stability of the pigment, methyl ethyl ketone is preferred.

The proportion between water and the organic solvent in the dispersing medium is not particularly limited. The proportion of water to a whole amount of the dispersing medium (a sum of water and the organic solvent) is preferably not less than 50% by mass, more preferably not less than 65% by mass, even more preferably not less than 75% by mass, and further even more preferably not less than 80% by mass, and is also preferably not more than 98% by mass, more preferably not more than 95% by mass, and even more preferably not more than 92% by mass.

As the mixing dispersers used in the dispersion treatment for obtaining the dispersion 1, there may be used various conventionally known dispersers. Examples of the dispersers include high-speed stirring mixers such as dispers and homomixers, kneading machines such as roll mills, kneaders and extruders, high-pressure dispersers such as high-pressure homogenizers, media-type dispersers such as paint shakers and beads mills, and mixing and stirring devices such as anchor blades. These dispersers may be used in combination of any two or more thereof.

Of these dispersers, from the viewpoint of uniformly dispersing the pigment in water, high-speed stirring mixers such as dispers and homomixers, and media-type dispersers such as paint shakers and beads mills are preferably used. Examples of the commercially available high-speed stirring mixers include "Ultra Disper" available from Asada Iron Works Co., Ltd. Examples of the commercially available media-type dispersers include "Ultra Apex Mill" available from Kotobuki Industries Co., Ltd., and "Pico Mill" available from Asada Iron Works Co., Ltd.

When using the media-type dispersers, the material of dispersing media used in the dispersing step is preferably a ceramic material such as zirconia and titania, a polymer material such as polyethylene and nylon, a metal, etc. Of these materials, from the viewpoint of good abrasion resistance, zirconia is more preferred. In addition, from the viewpoint of sufficiently atomizing the pigment, the diameter of the media is preferably not less than 0.003 mm, and more preferably not less than 0.01 mm, and is also preferably not more than 0.5 mm, and more preferably not more than 0.4 mm.

The dispersing time is preferably not less than 0.3 h, and more preferably not less than 1 h, from the viewpoint of sufficiently atomizing the pigment, and is also preferably not more than 200 h, and more preferably not more than 50 h, from the viewpoint of enhancing production efficiency of the pigment dispersion.

In the dispersion treatment in the step 1, from the viewpoint of atomizing and dispersing the pigment particles, it is preferred that after subjecting the mixed solution containing the pigment, the compound (A) represented by the formula (I) and water to dispersion treatment, the resulting dispersion is preferably further subjected to high-pressure dispersion treatment to obtain the dispersion 1, and it is more preferred that after subjecting the mixed solution containing the pigment, the compound (A) represented by the formula (I) and water to dispersion treatment using a high-speed stirring mixer or a media-type disperser, the resulting dispersion is further subjected to high-pressure dispersion treatment to obtain the dispersion 1.

The term "high-pressure dispersion" as used herein means that the dispersion treatment is conducted under a pressure of not less than 20 MPa. The dispersing pressure is preferably not less than 50 MPa, more preferably not less than 100 MPa, and even more preferably not less than 130 MPa, from the viewpoint of wetting the surface of the pigment with the compound (A) to uniformly disperse the pigment in the resulting dispersion.

The number of passes through the disperser upon the high-pressure dispersion treatment is preferably not less than 2, more preferably not less than 3, even more preferably not less than 5, further even more preferably not less than 7, and further even more preferably not less than 9, from the viewpoint of wetting the surface of the pigment with the compound (A) to uniformly disperse the pigment in the resulting dispersion. The operation method of the disperser may be either a circulating method or a continuous method. Of these operation methods, from the viewpoint of suppressing occurrence of distribution of the dispersion condition according to the number of passes through the disperser, preferred is a continuous method.

As the high-pressure dispersers used in the present invention, there may be mentioned homo-valve-type high-pressure homogenizers such as typically "High-Pressure Homogenizer" (tradename) available from Izumi Food Machinery Co., Ltd., and chamber-type high-pressure homogenizers such as "MICROFLUIDIZER" (tradename) available from Microfluidics Corp., "Nanomizer" (tradename) available from Yoshida Kikai Kogyo Co., Ltd., and "Ultimizer" and "Starburst" (tradenames) both available from Sugino Machine Ltd. Of these dispersers, preferred are chamber-type high-pressure homogenizers such as "MICROFLUIDIZER" (tradename), "Nanomizer" (tradename), and "Ultimizer" and "Starburst" (tradenames).

The temperature of the dispersion upon the high-pressure dispersion treatment is not particularly limited, and is preferably from 5 to 80° C.

When adding the organic solvent to the dispersing medium, the organic solvent is preferably removed from the obtained dispersion after the dispersion treatment, more preferably after the high-pressure dispersion treatment. Examples of an apparatus used for removing the organic solvent include a thin film distillation apparatus such as a batch simple distillation device, a reduced pressure distillation device and a flush evaporator, a rotary distillation device and a stirring evaporator. Among these apparatuses, from the viewpoint of efficiently removing the organic solvent from the dispersion, preferred are a rotary distillation device and a stirring evaporator. In the case where the organic solvent is removed at one time from the dispersion treatment product that is obtained in an amount as small as not more than 5 kg, the rotary distillation device is preferably used, whereas in the case where the organic solvent is removed at one time from the dispersion treatment product that is obtained in an amount as large as more than 5 kg, the stirring evaporator is preferably used. As the rotary distillation device, more preferred is a rotary reduced-pressure distillation device such as a rotary evaporator, and as the stirring evaporator, more preferred is a stirring tank thin film evaporator.

The temperature of the dispersion treatment product upon removing the organic solvent therefrom may be appropriately controlled according to the kind of organic solvent to be removed. The temperature of the dispersion treatment product upon removing the organic solvent therefrom under reduced pressure is preferably not lower than 20° C., more preferably not lower than 25° C., and even more preferably not lower than 30° C., and is also preferably not higher than 80° C., more preferably not higher than 70° C., and even more preferably not higher than 65° C.

The pressure used upon removal of the organic solvent is preferably not less than 0.01 MPa, more preferably not less than 0.02 MPa, and even more preferably not less than 0.05 MPa, and is also preferably not more than 0.5 MPa, more preferably not more than 0.2 MPa, and even more preferably not more than 0.1 MPa.

The time required for removal of the organic solvent is preferably not less than 1 h, more preferably not less than 2 h, and even more preferably not less than 5 h, and is also preferably not more than 24 h, more preferably not more than 12 h, and even more preferably not more than 10 h.

The removal of the organic solvent is conducted until the solid content of the dispersion 1 reaches preferably not less than 18% by mass, more preferably not less than 20% by mass, and even more preferably not less than 22% by mass, and also preferably not more than 60% by mass, and more preferably not more than 40% by mass.

(Dispersion 1)

The content of the pigment in the dispersion 1 is preferably not less than 5% by mass, more preferably not less than 10% by mass, and even more preferably not less than 15% by mass, from the viewpoint of attaining good coloring properties of the resulting ink, and is also preferably not more than 40% by mass, more preferably not more than 35% by mass, and even more preferably not more than 30% by mass, from the viewpoint of maintaining good dispersion stability of the pigment in the dispersion.

The content of the compound (A) represented by the formula (I) in the dispersion 1 is preferably not less than 0.1% by mass, more preferably not less than 0.5% by mass, and even more preferably not less than 1.0% by mass, from the viewpoint of maintaining good dispersion stability of the pigment in the dispersion, and is also preferably not more than 30% by mass, more preferably not more than 20% by mass, even more preferably not more than 10% by mass, and further even more preferably not more than 5.0% by mass, form the viewpoint of uniformly coating the pigment with the polymer in the emulsion polymerization step.

(Emulsion Polymerization)

The emulsion polymerization used in the present invention means the method in which the polymerizable monomer component including the hydrophobic vinyl-based monomer is emulsified or dispersed in the dispersing medium containing water as a main component in the presence of the compound (A) represented by the formula (I), and polymerized using a water-soluble polymerization initiator.

In the emulsion polymerization used in the present invention, the compound (A) represented by the formula (I) is used as an emulsifier and a polymerizable surfactant. The compound (A) represented by the formula (I) acts for providing a polymerization field by emulsification and suspension of the polymerizable monomer component as well as formation of micelles, and improving dispersion stability of emulsified particles (colored fine particles), etc. Since the compound (A) represented by the formula (I) contains at least one radical-polymerizable unsaturated double bond in a molecule thereof, the compound (A) is copolymerized with the polymerizable monomer component and incorporated into the polymer, so that it is possible to produce the colored fine particle dispersion containing the emulsified particles (colored fine particles) having an excellent dispersion stability.

The emulsion polymerization used in the present invention is not particularly limited as long as it is the method of conducting emulsion polymerization in the presence of the pigment, the compound (A) represented by the formula (I) and the polymerizable monomer component including the hydrophobic vinyl-based monomer. However, the emulsion polymerization is preferably conducted by the following step 2.

(Step 2)

In the step 2, the dispersion 1 is mixed with the polymerizable monomer component including the hydrophobic vinyl-based monomer, and the resulting mixture is subjected to emulsion polymerization.

In the dispersion 1 used in the step 2, the pigment particles are dispersed in the solvent containing water as a main component, and allowed to coexist with the compound (A) represented by the formula (I) which contains a hydrophilic group, a hydrophobic group and a polymerizable group. When mixing the dispersion 1 with the polymerizable monomer component including the hydrophobic vinyl-based monomer to copolymerize the polymerizable group of the compound (A) represented by the formula (I) with the polymerizable group of the polymerizable monomer component, for example, by adding a polymerization initiator to the obtained mixture, it is possible to produce the colored fine particle dispersion containing the emulsified particles (colored fine particles) constituted of the pigment coated with the polymer.

In the emulsion polymerization used in the present invention, as the emulsifier, the compound (A) may be used in combination with an anionic surfactant or a nonionic surfactant other than the compound (A). However, in such a case, the compound (A) represented by the formula (I) is preferably used in an amount of from 5 to 100% by mass, and more preferably from 20 to 100% by mass, on the basis of a total amount of the emulsifiers used therein.

As the polymerization initiator, there may be used any of polymerization initiators that may be suitably used for ordinary emulsion polymerization processes. Specific examples of the polymerization initiator include persulfates such as potassium persulfate and ammonium persulfate; hydrogen peroxide; organic peroxides such as t-butyl hydroperoxide, benzoyl peroxide and cumene hydroperoxide; and azo-based initiators such as azobisdiisobutyronitrile and 2,2-azobis(2-amidinopropane) dihydrochloride. Of these polymerization initiators, preferred are persulfates. In addition, as the polymerization initiator, there may also be used redox-based initiators formed of a combination of the peroxide with a reducing agent such as sodium sulfite, rongalite and ascorbic acid.

In the emulsion polymerization, a chain transfer agent may also be used. Examples of the chain transfer agent include mercaptans such as n-dodecyl mercaptan, t-dodecyl mercaptan and n-octyl mercaptan; xanthogens such as dimethyl xanthogen disulfide and diisobutyl xanthogen disulfide; and dipentene, indene, 1,4-cyclohexadiene, dihydrofuran and xanthene.

The dispersing medium used in the emulsion polymerization may contain, in addition to water, an optional organic solvent.

Examples of the organic solvent that may be used in the dispersing medium include alcohols having not less than 1 and not more than 6 carbon atoms, ketones, ethers, amides, aromatic hydrocarbons, and aliphatic hydrocarbons having not less than 5 and not more than 10 carbon atoms.

The proportion between water and the organic solvent in the dispersing medium is not particularly limited. The proportion of water to a whole amount of the dispersing medium is preferably not less than 50% by mass, more preferably not less than 65% by mass, even more preferably not less than 75% by mass, and further even more preferably not less than 80% by mass.

The conditions of the emulsion polymerization in the present invention are not particularly limited. The amount of the polymerizable monomer component used in the emulsion polymerization is preferably not less than 1% by mass, more preferably not less than 10% by mass, and even more preferably not less than 15% by mass, on the basis of the whole components present in the reaction system of the emulsion polymerization reaction, from the viewpoint of improving storage stability of the resulting ink, and is also preferably not more than 60% by mass, more preferably not more than 40% by mass, and even more preferably not more than 25% by mass, on the basis of the whole components present in the reaction system of the emulsion polymerization reaction, from the viewpoint of suppressing increase in viscosity of the resulting ink when concentrated.

The mass ratio of the polymerizable monomer component to the pigment (polymerizable monomer component/pigment) upon the emulsion polymerization is preferably from 90/10 to 10/90, more preferably from 80/20 to 20/80, and even more preferably from 75/25 to 40/60, from the viewpoints of suppressing increase in viscosity of the resulting ink when concentrated and suppressing increase in viscosity of the resulting ink when concentrated.

The polymerizable monomer component may be added by known methods such as a monomer dropwise addition method, a monomer batch charging method and a pre-emulsion method. Of these methods, from the viewpoint of attaining good polymerization stability, the pre-emulsion method is preferably used. The pre-emulsion method is the method in which a pre-emulsion prepared by previously mixing and emulsifying the polymerizable monomer component, an emulsifier and water is added dropwise to the dispersion.

From the viewpoint of suppressing formation of coarse particles, the pre-emulsion is prepared using a rotary stirring device. The rotating speed of the rotary stirring device is preferably not less than 200 rpm, and more preferably not less than 300 rpm, and is also preferably not more than 5000 rpm, more preferably not more than 2000 rpm, and even more preferably not more than 1000 rpm. The stirring time is preferably not less than 10 min, and more preferably not more than 30 min.

In the pre-emulsion method, the time of the dropwise addition of the pre-emulsion is preferably not less than 0.5 h, and more preferably not less than 1 h, from the viewpoint of obtaining emulsified particles having a uniform particle size in the resulting emulsion, and is also not more than 8 h, and more preferably not more than 6 h, from the viewpoint of improving reactivity of the emulsion polymerization. The aging time is preferably not less than 0.5 h, and more preferably not less than 1 h, and is also preferably not more than 5 h, and more preferably not more than 3 h.

The polymerization temperature may be appropriately controlled according to a decomposition temperature of the polymerization initiator, and is preferably not lower than 50° C., more preferably not lower than 60° C., and even more preferably not lower than 70° C., from the viewpoint of improving improving reactivity of the emulsion polymerization, and is also preferably not higher than 90° C., and more preferably not higher than 85° C., from the viewpoint of improving the molecular weight distribution of the resulting polymer.

The polymerization temperature when using a persulfate as a water-soluble polymerization initiator is preferably not lower than 70° C., and more preferably not lower than 75° C., from the viewpoint of improving reactivity of the emulsion polymerization, and is also preferably not higher than 85° C., and more preferably not higher than 83° C., from the viewpoint of improving the molecular weight distribution of the resulting polymer.

The polymerization atmosphere is preferably a nitrogen atmosphere or an atmosphere of an inert gas such as argon, from the viewpoint of improving reactivity of the emulsion polymerization.

The amount of the compound (A) represented by the formula (I) used upon the emulsion polymerization is preferably not less than 0.5 part by mass, more preferably not less than 1.0 part by mass, even more preferably not less than 3.0 parts by mass, and further even more preferably not less than 5.0 parts by mass, and is also preferably not more than 40 parts by mass, more preferably not more than 30 parts by mass, even more preferably not more than 20 parts by mass, and further even more preferably not more than 15 parts by mass, on the basis of 100 parts by mass of the polymerizable monomer component, from the viewpoints of stably conducting the emulsion polymerization and reducing a residual amount of the compound (A) represented by the formula (I) in the emulsion polymerization. Meanwhile, the amount of the compound (A) used upon the emulsion polymerization means a total amount of the compound (A) on the basis of 100 parts by mass of the polymerizable monomer component contained in the whole reaction system upon the emulsion polymerization.

The amount of the water-soluble polymerization initiator used is preferably not less than 0.01 part by mass, more preferably not less than 0.05 part by mass, and even more preferably not less than 0.1 part by mass, and is also preferably not more than 5 parts by mass, more preferably not more than 3 parts by mass, and even more preferably not more than 1 parts by mass, on the basis of 100 parts by mass of the polymerizable monomer component, from the viewpoint of improving the molecular weight distribution of the resulting polymer.

[Water-Based Ink for Ink-Jet Printing]

The water-based ink for ink-jet printing according to the present invention includes the colored fine particle dispersion according to the present invention. The colored fine particle dispersion according to the present invention is used as a colorant for the water-based ink for ink-jet printing.

The colored fine particle dispersion according to the present invention may be directly used as the water-based ink for ink-jet printing. However, the water-based ink may also be prepared by further adding various ordinary additives such as a wetting agent, a penetrant, a dispersant, a surfactant, a viscosity controller, a defoaming agent, an antiseptic agent, a mildew-proof agent and a rust preventive to the colored fine particle dispersion.

The content of the pigment in the water-based ink is preferably not less than 1% by mass, more preferably not less than 1.5% by mass, and even more preferably not less than 2.0% by mass, and is also preferably not more than 15% by mass, more preferably not more than 10% by mass, and even more preferably not more than 6.0% by mass, from the viewpoints of improving storage stability of the water-based ink and enhancing optical density of the ink.

The content of the polymer in the water-based ink is preferably not less than 0.5% by mass, more preferably not less than 0.8% by mass, even more preferably not less than 1.0% by mass, and further even more preferably not less than 2% by mass, and is also preferably not more than 30% by mass, more preferably not more than 20% by mass, and even more preferably not more than 12% by mass, from the viewpoints of improving storage stability of the water-based ink and enhancing rub fastness of the printed characters or images when printed on a low-water absorbing recording medium.

The content of water in the water-based ink for ink-jet printing is preferably not less than 20% by mass, more preferably not less than 30% by mass, and even more preferably not less than 40% by mass, from the viewpoints of enhancing optical density and rub fastness of the printed characters or images when printed on a low-water absorbing recording medium and improving storage stability of the water-based ink, and is also preferably not more than 70% by mass, more preferably not more than 65% by mass, and even more preferably not more than 60% by mass, from the viewpoint of improving ejection properties of the water-based ink.

The mass ratio of the pigment to the polymer [pigment/polymer] in the water-based ink is preferably not less than 0.1, more preferably not less than 0.2, and even more preferably not less than 0.4, and is also preferably not more than 4.0, more preferably not more than 2.0, and even more preferably not more than 1.0, from the viewpoints of suppressing increase in viscosity of the water-based ink when concentrated, enhancing optical density of the water-based ink when printed on a low-water absorbing recording medium, and improving storage stability of the water-based ink.

(Properties of Water-Based Ink)

The average particle size of the emulsified particles (colored fine particles) in the water-based ink is preferably not less than 10 nm, more preferably not less than 30 nm, even more preferably not less than 40 nm, further even more preferably not less than 50 nm, further even more preferably not less than 60 nm, further even more preferably not less than 75 nm, and further even more preferably not less than 80 nm, and is also preferably not more than 300 nm, more preferably not more than 160 nm, even more preferably not more than 150 nm, further even more preferably not more than 140 nm, and further even more preferably not more than 130 nm, from the viewpoints of improving storage stability of the water-based ink and enhancing rub fastness of the printed characters or images when printed on a low-water absorbing recording medium.

Meanwhile, the average particle size of the particles in the water-based ink may be measured by the method described in Examples below.

The viscosity of the water-based ink as measured at 32° C. is preferably not less than 2.0 mPa·s, more preferably not less than 3.0 mPa·s, and even more preferably not less than 4.0 mPa·s, and is also preferably not more than 12 mPa·s, more preferably not more than 9.0 mPa·s, and even more preferably not more than 7.0 mPa·s, from the viewpoint of improving storage stability and ejection properties of the water-based ink.

Meanwhile, the viscosity at 32° C. of the water-based ink may be measured by the method described in Examples below.

The static surface tension of the water-based ink as measured at 20° C. is preferably not less than 20 mN/m, and more preferably not less than 25 mN/m, and is also preferably not more than 50 mN/m, more preferably not more than mN/m, even more preferably not more than 40 mN/m, and further even more preferably not more than 35 mN/m, from the viewpoint of improving ejection properties of the water-based ink. Meanwhile, the static surface tension at 20° C. of the water-based ink may be measured by the method described in Examples below.

The pH value of the water-based ink is preferably not less than 7.0, more preferably not less than 7.5, and even more preferably not less than 8.0, from the viewpoint of improving storage stability of the water-based ink and enhancing rub fastness of the printed characters or images when printed on a low-water absorbing recording medium, and is also preferably not more than 11.0, more preferably not more than 10.0, and even more preferably not more than 9.5, from the viewpoint of improving resistance of members to the water-based ink and suppressing skin irritation. Meanwhile, the pH value of the water-based ink may be measured by the method described in Examples below.

(Ink-Jet Printing Method)

The water-based ink according to the present invention may be used in an ink-jet printing method in which characters or images are printed on a recording medium such as a plain paper or an ink-jet paper, in particular, the water-based ink is preferably used in an ink-jet printing method in which characters or images are printed on a low-water absorbing recording medium, in view of excellent rub fastness thereof.

As the method of ejecting the water-based ink in an ink-jet printer, there may be mentioned ink-ejecting methods using thermal-type or piezoelectric-type ink-jet print heads. In the present invention, the ink is preferably ejected and printed by the method using a piezoelectric-type ink-jet print head.

The water absorption of the low-water absorbing recording medium used in the present invention as measured by contacting with pure water for 100 ms is preferably not less than 0 g/m$^2$, more preferably not less than 1.0 g/m$^2$, and even more preferably not less than 2.0 g/m$^2$, from the viewpoint of promoting drying of the printed characters or images and enhancing rub fastness of the printed characters or images, and is also preferably not more than 10 g/m², more preferably not more than 8.0 g/m², even more preferably not more than 6.0 g/m² and further even more preferably not more than 4.0 g/m², from the viewpoint of enhancing optical density and gloss of the printed characters or images.

As the low-water absorbing recording medium for ink-jet printing, from the viewpoint of improving rub fastness of the printed characters or images, there are preferably used a coated paper or a synthetic resin film, and more preferably a synthetic resin film.

Examples of the coated paper include "OK Topcoat+" (available from Oji Paper Co., Ltd.; basis weight: 104.7 g/m²; 60° gloss: 49.0; water absorption as measured by contacting with pure water for 100 ms (hereinafter defined in the same way): 4.9 g/m²), a multi-color foam gloss coated paper (available from Oji Paper Co., Ltd.; basis weight: 104.7 g/m²; 60° gloss: 36.8; water absorption: 5.2 g/m²), "UPM Finesse Gloss" (available from UPM; basis weight: 115 g/m²; 60° gloss: 27.0; water absorption: 3.1 g/m²), "UPM Finesse Matt" (available from UPM; basis weight: 115 g/m²; 60° gloss: 5.6; water absorption: 4.4 g/m²), "TerraPress Silk" (available from Stora Enso; basis weight: 80 g/m²; 60° gloss: 6.0; water absorption: 4.1 g/m²), and "LumiArt" (available from Stora Enso; basis weight: 90 g/m²; 60° gloss: 26.3).

Examples of the synthetic resin film include a polyester film, a vinyl chloride film, a polypropylene film, a polyethylene film and a nylon film. These films may be subjected to surface treatments such as corona treatment, etc., if required.

Examples of the generally available synthetic resin films include "Lumirror T60" (available from Toray Industries, Inc.; polyethylene terephthalate; thickness: 125 μm; 60° gloss: 189.1; water absorption: 2.3 g/m²), "PVC80B P" (available from LINTEC Corp.; polyvinyl chloride; 60° gloss: 58.8; water absorption: 1.4 g/m²), "KINATH KEE70CA" (available from LINTEC Corp.; polyethylene), "YUPO SG90 PAT1" (available from LINTEC Corp.; polypropylene), and "BONYL RX" (available from KOHJIN Film & Chemical Co., Ltd.; nylon).

With respect to the aforementioned embodiments, the present invention further provides the following aspects relating to the process for producing a colored fine particle dispersion, and a water-based ink including the colored fine particle dispersion produced by the process.

<1> A colored fine particle dispersion including emulsified particles including a pigment and a polymer containing a constitutional unit derived from a compound (A) represented by the following general formula (I) and a constitutional unit derived from a polymerizable monomer component including a hydrophobic vinyl-based monomer:

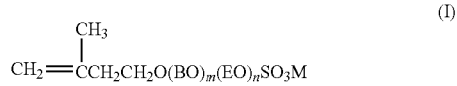

(I)

wherein BO is a butyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25.

<2> The colored fine particle dispersion according to the aspect <1>, wherein in the general formula (I), m is preferably not less than 2, more preferably not less than 3, and even more preferably not less than 4, and is also preferably not more than 9, more preferably not more than 8, and even more preferably not more than 7.

<3> The colored fine particle dispersion according to the aspect <1> or <2>, wherein in the general formula (I), n is preferably not less than 5, more preferably not less than 7, even more preferably not less than 9, and further even more preferably not less than 11, and is also preferably not more than 23, more preferably not more than 21, and even more preferably not more than 19.

<4> The colored fine particle dispersion according to any one of the aspects <1> to <3>, wherein in the general formula (I), M is preferably a monovalent cation, and more preferably ammonium.

<5> The colored fine particle dispersion according to any one of the aspects <1> to <4>, wherein a content of the constitutional unit derived from the compound (A) represented by the general formula (I) in the polymer is preferably not less than 3 parts by mass, more preferably not less than 4 parts by mass, and even more preferably not less than 5 parts by mass, and is also preferably not more than 20 parts by mass, more preferably not more than 15 parts by mass, and even more preferably not more than 12 parts by mass, in terms of the monomer, on the basis of 100 parts by mass of the constitutional unit derived from the polymerizable monomer component.

<6> The colored fine particle dispersion according to any one of the aspects <1> to <5>, wherein the hydrophobic vinyl-based monomer is preferably at least one compound selected from the group consisting of a (meth)acrylic acid ester and an aromatic ring-containing hydrophobic monomer, more preferably at least one compound selected from the group consisting of (meth)acrylic acid esters containing an alkyl group having not less than 1 and not more than 10 carbon atoms, and even more preferably at least one compound selected from the group consisting of methyl acrylate, ethyl acrylate, methyl methacrylate, ethyl methacrylate, 2-ethylhexyl acrylate and 2-ethylhexyl methacrylate.

<7> The colored fine particle dispersion according to any one of the aspects <1> to <6>, wherein the polymerizable monomer component preferably contains an ionic monomer, more preferably a carboxylic acid monomer, even more preferably (meth)acrylic acid, and further even more preferably methacrylic acid.

<8> The colored fine particle dispersion according to the aspect <7>, wherein a content of the ionic monomer in the polymerizable monomer component is preferably not less than 0% by mass, more preferably not less than 0.1% by mass, even more preferably not less than 1% by mass, and further even more preferably not less than 2% by mass, and is also preferably not more than 20% by mass, more preferably not more than 15% by mass, even more preferably not more than 10% by mass, and further even more preferably not more than 7% by mass.

<9> The colored fine particle dispersion according to any one of the aspects <1> to <8>, wherein the pigment is preferably a pigment subjected to no hydrophilic treatment, and more preferably a pigment that is not subjected to a treatment in which at least one anionic or cationic hydrophilic functional group is bonded onto a surface of the pigment either directly or through the other atom group.

<10> The colored fine particle dispersion according to any one of the aspects <1> to <9>, wherein a content of the pigment in the colored fine particle dispersion is preferably not less than 1.0% by mass, more preferably not less than 3.0% by mass, and even more preferably not less than 5.0% by mass, and is also preferably not more than 40% by mass, more preferably not more than 30% by mass, even more preferably not more than 20% by mass, and further even more preferably not more than 15% by mass.

<11> The colored fine particle dispersion according to any one of the aspects <1> to <10>, wherein a content of the polymer in the colored fine particle dispersion is preferably not less than 1.0% by mass, more preferably not less than 5.0% by mass, and even more preferably not less than 15% by mass, and is also preferably not more than 50% by mass, more preferably not more than 40% by mass, and even more preferably not more than 30% by mass.

<12> The colored fine particle dispersion according to any one of the aspects <1> to <11>, wherein an average particle size of the emulsified particles is preferably not less than 10 nm, more preferably not less than 30 nm, even more preferably not less than 40 nm, further even more preferably not less than 50 nm, further even more preferably not less than 60 nm, further even more preferably not less than 75 nm, and further even more preferably not less than 80 nm, and is also preferably not more than 300 nm, more preferably not more than 160 nm, even more preferably not more than 150 nm, further even more preferably not more than 140 nm, and further even more preferably not more than 130 nm.

<13> A process for producing the colored fine particle dispersion according to any one of the aspects <1> to <12>, including the step of conducting emulsion polymerization in the presence of the pigment, the compound (A) represented by the following general formula (I), and the polymerizable monomer component including the hydrophobic vinyl-based monomer:

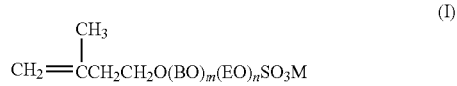

(I)

wherein BO is a butyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25.

<14> The process for producing the colored fine particle dispersion according to the aspect <13>, including the following steps 1 and 2:
step 1: subjecting a mixed solution including the pigment, the compound (A) represented by the aforementioned general formula (I) and water to dispersion treatment to obtain a dispersion 1; and
step 2: mixing the dispersion 1 and the polymerizable monomer component including the hydrophobic vinyl-based monomer and subjecting the resulting mixture to emulsion polymerization.

<15> The process for producing the colored fine particle dispersion according to the aspect <14>, wherein in the step 1, after subjecting the mixed solution including the pigment, the compound (A) represented by the general formula (I) and water to dispersion treatment, and preferably to the dispersion treatment using a high-speed stirring mixer or a media-type disperser, the resulting dispersion is further subjected to high-pressure dispersion treatment to obtain the dispersion 1.

<16> The process for producing the colored fine particle dispersion according to any one of the aspects <13> to <15>, wherein a mass ratio of the polymerizable monomer component to the pigment (polymerizable monomer component/pigment) upon the emulsion polymerization is preferably from 90/10 to 10/90, more preferably from 80/20 to 20/80, and even more preferably from 75/25 to 40/60.

<17> The process for producing the colored fine particle dispersion according to any one of the aspects <13> to <16>, wherein an amount of the compound (A) represented by the aforementioned general formula (I) used upon the emulsion polymerization is preferably not less than 0.5 part by mass, more preferably not less than 1.0 part by mass, even more preferably not less than 3.0 parts by mass, and further even more preferably not less than 5.0 parts by mass, and is also preferably not more than 40 parts by mass, more preferably not more than 30 parts by mass, even more preferably not more than 20 parts by mass, and further even more preferably not more than 15 parts by mass, on the basis of 100 parts by mass of the polymerizable monomer component.

<18> A water-based ink for ink-jet printing, including the colored fine particle dispersion according to any one of the aspects <1> to <12>.

<19> The water-based ink for ink-jet printing according to the aspect <18>, wherein an average particle size of the emulsified particles in the water-based ink is preferably not less than 10 nm, more preferably not less than 30 nm, even more preferably not less than 40 nm, further even more preferably not less than 50 nm, further even more preferably not less than 60 nm, further even more preferably not less than 75 nm, and further even more preferably not less than 80 nm, and is also preferably not more than 300 nm, more preferably not more than 160 nm, even more preferably not more than 150 nm, further even more preferably not more than 140 nm, and further even more preferably not more than 130 nm.

<20> The water-based ink for ink-jet printing according to the aspect <18> or <19>, wherein a viscosity of the water-based ink as measured at 32° C. is preferably not less than 2.0 mPa·s, more preferably not less than 3.0 mPa·s, and even more preferably not less than 4.0 mPa·s, and is also preferably not more than 12 mPa·s, more preferably not more than 9.0 mPa·s, and even more preferably not more than 7.0 mPa·s.

<21> The water-based ink for ink-jet printing according to any one of the aspects <18> to <20>, wherein a static surface tension of the water-based ink as measured at 20° C. is preferably not less than 20 mN/m, and more preferably not less than 25 mN/m, and is also preferably not more than 50 mN/m, more preferably not more than 45 mN/m, even more preferably not more than 40 mN/m, and further even more preferably not more than 35 mN/m.

<22> The water-based ink for ink-jet printing according to any one of the aspects <18> to <21>, wherein a pH value of the water-based ink is preferably not less than 7.0, more preferably not less than 7.5, and even more preferably not less than 8.0, and is also preferably not more than 11.0, more preferably not more than 10.0, and even more preferably not more than 9.5.

<23> A use of the colored fine particle dispersion according to any one of the aspects <1> to <12>, as a colorant for a water-based ink for ink-jet printing.

EXAMPLES

In the following Production Example, Examples and Comparative Examples, the "part(s)" and "%" indicate "part(s) by mass" and "% by mass", respectively, unless otherwise specified.

(1) Measurement of Average Particle Sizes of Dispersed Particles in Pigment Dispersion, Colored Fine Particle Dispersion and Water-Based Ink The average particle size of the dispersed particles in the respective dispersions and ink was measured using a laser particle analyzing system "ELS-8000" (cumulant analysis) available from Otsuka Electronics Co., Ltd. The measurement was conducted under the conditions including a temperature of 25° C., an angle between incident light and a detector of 90° and a cumulative number of 100 times, and a refractive index of water (1.333) was input to the analyzing system as a refractive index of the dispersing medium. In the measurement, the concentration of the particles in the dispersion was adjusted to $5 \times 10^{-3}\%$ by mass (in terms of a solid content).

(2) Measurement of Solid Content of Pigment Dispersion and Colored Fine Particle Dispersion Using an infrared moisture meter "FD-230" (tradename) available from Kett Electric Laboratory, 5 g of an aqueous dispersion was dried at a drying temperature of 150° C. under a measuring mode 96 (monitoring time: 2.5 min/variation range: 0.05%) to measure a water content on a wet base (% by mass) of the aqueous dispersion. The solid content of the aqueous dispersion was calculated according to the following formula:

Solid Content(% by weight)=100−$M$ wherein M is a water content on a wet base (% by mass) of the aqueous dispersion which is represented by the formula: $[(W-W_0)/W] \times 100$ wherein W is a mass of the sample before drying (initial mass of the sample); and $W_0$ is a mass of the sample after drying (absolute dry mass).

(3) Measurement of Viscosity of Water-Based Ink

The viscosity of the water-based ink was measured at 32° C. using an E-type viscometer "Model No. TV-25" (using a standard cone rotor (1° 34'×R24); rotating speed: 50 rpm) available from Toki Sangyo Co., Ltd. The data obtained in this measurement were used as data for the below-mentioned storage stability test.

(4) Measurement of Static Surface Tension of Water-Based Ink

A platinum plate was dipped in 5 g of the water-based ink adjusted to a temperature of 20° C. and filled in a cylindrical polyethylene vessel (3.6 cm in diameter×1.2 cm in depth), and the static surface tension of the water-based ink was measured using a surface tension meter "CBVP-Z" available from Kyowa Interface Science Co., Ltd., by Wilhelmy method.

(5) Measurement of pH of Water-Based Ink

The pH value of the water-based ink at 25° C. was measured using a bench-top pH meter "F-71" available from Horiba Ltd., equipped with a pH electrode "6337-10D" available from Horiba Ltd.

Examples 1 to 3 and Comparative Examples 1 and 2

<Synthesis of Colored Fine Particle Dispersion by Emulsion Polymerization>

(Pigment Dispersion Step: Step 1)

A polyethylene vessel was charged with a polymerizable surfactant, ion-exchanged water, methyl ethyl ketone and a pigment ("Pigment Blue 15:3") as shown in "Initially Charged Composition" in Table 1-1, and the contents of the polyethylene vessel were subjected to dispersion treatment at 7000 rpm for 1 h while cooling in an ice bath at 0° C. Then, the obtained mixture was mixed with 90 parts by mass of ion-exchanged water, and subjected to dispersion treatment under a pressure of 150 MPa by passing through a microfluidizer (tradename) "Model No. M-110EH-30XP" available from Microfluidics Corp., 15 times. The resulting dispersion was diluted with ion-exchanged water until the solid content of the dispersion reached 15% by mass. Then, the thus obtained diluted dispersion was treated at 60° C. under reduced pressure using an evaporator to remove methyl ethyl ketone therefrom and concentrate the dispersion into a predetermined solid content, thereby obtaining a pigment dispersion (solid content: 25%). The average particle size of the particles in the thus obtained pigment dispersion was shown in Table 1. Meanwhile, the values shown in Table 1 represent "part(s) by mass", and the similar values as shown in the subsequent Tables are also defined in the same way.

(Emulsion Polymerization Step: Step 2)

A glass vessel was charged with a vinyl-based monomer, a polymerizable surfactant, potassium persulfate and ion-exchanged water as shown in "Charged Composition for Pre-Emulsion" in Table 1-2, and the contents of the glass vessel were stirred using a Teflon (registered trademark) stirring blade at 500 rpm for 30 min, thereby obtaining a pre-emulsion.

A separable flask was charged with a pigment dispersion and ion-exchanged water as shown in "Initially Charged Composition" in Table 1-3, and the contents of the flask were heated to 80° C. in a hot water bath while stirring at 250 rpm. After the temperature of the dispersion in the flask reached 80° C., a whole amount of the pre-emulsion previously prepared above was added dropwise thereinto over 1 h. After completion of the dropwise addition of the pre-emulsion, the resulting mixture was aged at 80° C. for 2 h, thereby obtaining a colored fine particle dispersion containing emulsified particles (colored fine particles). Properties of the thus obtained colored fine particle dispersion are shown in Table 1-3. In addition, the emulsified particles (colored fine particles) contained in the resulting colored fine particle dispersion were observed by a scanning electron microscope. As a result, it was confirmed that the pigment was coated with the polymer.

TABLE 1-1

Initially Charged Composition for Pigment Dispersion/Evaluation Results

| No. of pigment dispersion | | — | PD-1 | PD-2 | PD-3 |
|---|---|---|---|---|---|
| Initially charged composition | Polymerizable surfactant | Kind | Compound (a) | KH-5 | KH-10 |
| | | part(s) by mass | 44.4 | 8.9 | 8.9 |
| | Ion-exchanged water | part(s) by mass | 196.3 | 231.9 | 231.9 |
| | Methyl ethyl ketone | part(s) by mass | 34.8 | 34.8 | 34.8 |
| | Pigment (P.B. 15:3) | part(s) by mass | 80.0 | 80.0 | 80.0 |
| Properties of pigment dispersion | Average particle size | μm | 95.0 | 90.2 | 86.0 |
| | Solid content | % | 25.0 | 25.0 | 25.0 |

TABLE 1-2

Charged Composition for Pre-Emulsion

| | | | No. of pre-emulsion | | | | |
|---|---|---|---|---|---|---|---|
| | | | EC-1 | EC-2 | EC-3 | EC-4 | EC-5 |
| Charged composition for pre-emulsion (*1) | Methacrylic acid | part(s) by mass | — | 1.25 (2.5) | 2.5 (5.0) | 1.25 (2.5) | 1.25 (2.5) |
| | Methyl methacrylate | part(s) by mass | 37.5 (75.0) | 36.25 (72.5) | 35.00 (70.0) | 36.25 (72.5) | 36.25 (72.5) |
| | 2-Ethylhexyl acrylate | part(s) by mass | 12.5 (25.0) | 12.5 (25.0) | 12.5 (25.0) | 12.5 (25.0) | 12.5 (25.0) |
| | Potassium persulfate (KPS) | part(s) by mass | 0.10 | 0.10 | 0.10 | 0.10 | 0.10 |
| | Polymerizable surfactant | Kind | Compound (a) | Compound (a) | Compound (a) | KH-5 | KH-10 |
| | | part(s) by mass | 7.50 | 7.50 | 7.50 | 1.50 | 1.50 |
| | Ion-exchanged water | part(s) by mass | 21.50 | 21.50 | 21.50 | 27.50 | 27.50 |

Note
(*1): The values in parentheses are ratios (% by mass) based on a total amount of the polymerizable monomer component.

TABLE 1-3

Initially Charged Composition for Colored Fine Particle Dispersion/Evaluation Results

| | | | Example 1 | Example 2 | Example 3 | Comparative Example 1 | Comparative Example 2 |
|---|---|---|---|---|---|---|---|
| Initially charged composition | Pre-emulsion | Kind | EC-1 | EC-2 | EC-3 | EC-4 | EC-5 |
| | Pigment dispersion | Kind | PD-1 | PD-1 | PD-1 | PD-2 | PD-3 |
| | | part(s) by mass | 100.0 | 100.0 | 100.0 | 100.0 | 100.00 |
| | Ion-exchanged water | part(s) by mass | 72.5 | 72.5 | 72.5 | 72.5 | 72.5 |
| Properties of colored fine particle dispersion | Average particle size | nm | 100.0 | 97.0 | 104.0 | 105.0 | 100.0 |
| | Solid content | % | 30.0 | 30.0 | 30.0 | 30.0 | 30.0 |

Meanwhile, the details of the polymerizable surfactants shown in Table 1-1 and Table 1-2 are as follows.

Compound (a): Compound represented by the following general formula (1) which was used in the form of a 20% by mass aqueous solution. The process for producing the compound (a) is described in the below-mentioned Production Example 1. The amount of the compound (a) is shown in terms of an amount of an aqueous solution thereof in Table 1-1 and Table 1-2.

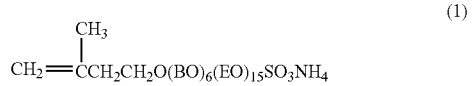

(1)

(wherein BO is a butyleneoxy group; and EO is an ethyleneoxy group.)

KH-5: "ACUALON KH-5" (tradename; solid content: 100% by mass) available from DSK Co., Ltd.; a mixture of a compound represented by the following general formula (2) in which R is an alkyl group having 10 carbon atoms and n is 5, and a compound represented by the following general formula (2) in which R is an alkyl group having 12 carbon atoms and n is 5.

KH-10: "ACUALON KH-10" (tradename; solid content: 100% by mass) available from DSK Co., Ltd.; a mixture of a compound represented by the following general formula (2) in which R is an alkyl group having 10 carbon atoms and n is 10, and a compound represented by the following general formula (2) in which R is an alkyl group having 12 carbon atoms and n is 10.

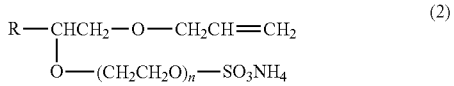

(2)

Production Example 1

A reaction vessel equipped with a stirrer, a thermometer and a dropping funnel was charged with 310 g (3.6 mol) of 3-methyl-3-butene-1-ol available from Tokyo Chemical Industry Co., Ltd., followed by cooling the contents of the reaction vessel to 10° C. in a nitrogen atmosphere. Then, 10.22 g (0.0723 mol) of a boron trifluoride diethyl ether complex available from Wako Pure Chemical Industries, Ltd., was added to the reaction vessel, and then 1557.94 g (21.6 mol) of 1,2-epoxybutane(butyleneoxide) was added dropwise to the reaction vessel at a temperature of 7 to 10° C. After completion of the dropwise addition, the contents of the reaction vessel were aged at 10° C. for 1 h. In addition, 32.0 g of an adsorbent "KYOWAAD 500SH" available from Kyowa Chemical Industry Co., Ltd., was added to the reaction vessel, and the contents of the reaction vessel were stirred at room temperature for 1 h, then subjected to filtration under reduced pressure, thereby obtaining an adduct of 3-methyl-3-buten-1-ol with 6 mol of 1,2-epoxybutane.

The thus obtained adduct of 3-methyl-3-buten-1-ol with 6 mol of 1,2-epoxybutane was charged together with 7.26 g (0.134 mol) of powdery sodium methoxide into an autoclave, and then 2379 g (54 mol) of ethyleneoxide was added thereto at 130° C. under 0.3 MPa. Next, 84.7 g of a part of the resulting reaction mixture and 9.60 g of amidosulfuric acid were charged into a reaction vessel equipped with a stirrer and a thermometer, and reacted with each other at 120° C. for 90 min in a nitrogen atmosphere to obtain a sulfated product, and unreacted amidosulfuric acid was removed by filtration under pressure from the resulting reaction solution, thereby obtaining a compound (a).

Examples 4 to 6 and Comparative Examples 3 and 4

<Preparation of Printing Ink>

A glass vessel was charged with the colored fine particle dispersion, a 1 N sodium hydroxide aqueous solution and ion-exchanged water as shown in Table 2, and the content of the glass vessel were stirred for 10 min using a magnetic stirrer, thereby obtaining a mixture A. Separately, a glass vessel was charged with propylene glycol, 1,3-butanediol, "FTERGENT 215M" (fluorine-based surfactant) available from NEOS Co., Ltd., and "ACETYLENOL E100" (an adduct of 2,4,7,9-tetramethyl-5-decyne-4,7-diol with 10 mol of ethyleneoxide) available from Kawaken Fine Chemicals Co., Ltd., and the contents of the glass vessel were stirred for 10 min using a magnetic stirrer, thereby obtaining a mixture B. While stirring the mixture A, the mixture B was added thereto, and the resulting mixture was continuously stirred for 1 h. Thereafter, the mixture was subjected to filtration through a 5 μm disposable membrane filter "Minisart" available from Sartorius Inc., thereby obtaining a printing ink. Properties of the thus obtained printing ink are shown in Table 2.

Next, using the thus prepared printing ink, the ink-jet printed materials as described in the below-mentioned item (1) were produced and evaluated for rub fastness thereof by the method described in the below-mentioned item (2). In addition, the thus prepared printing ink was further evaluated for concentration-dependent viscosity behavior thereof as described in the below-mentioned item (3) and storage stability thereof as described in the below-mentioned item (4). The results are shown in Table 2.

(1) Production of Ink-Jet Printed Materials

The water-based ink obtained in the respective Examples and Comparative Examples was loaded into a commercially available ink-jet printer "GX-2500" (piezoelectric type) available from Ricoh Co., Ltd., and A4 size (monochrome) solid image printing was carried out on a polyester film "Lumirror T60" (thickness: 75 μm; water absorption: 2.3 g/m$^2$) available from Toray Industries Inc., at 23° C. and 50% RH under the printing condition of "gloss coated paper; Clean; no color matching". After completion of the printing, the resulting printed materials were heated and dried on a hot plate at 80° C. for 5 min.

(2) Rub Fastness Test for Printed Materials

The above-obtained printed materials were subjected to a rub fastness test in which each printed material was rubbed with a cotton "BEMCOT M-3" available from Asahi Kasei Corp., as a friction material using "Sutherland-type Ink Rub Tester AB-201" (available from Tester Sangyo Co., Ltd.) under a load of 2000 g 100 times (reciprocating operations). The rubbed printed material was observed by the naked eyes and evaluated according to the following evaluation ratings.

[Evaluation Ratings]

A: Print defects were unobservable by naked eyes, and therefore rub fastness of the printed characters or images was very excellent.

A−: Print defects were observable by naked eyes, but the ink was still usable without any significant problem.

B: Print defects were observable by naked eyes, and a surface of the film was partially exposed outside to thereby pose some problem.

C: A whole surface of the film was exposed outside to thereby pose significant problem.

(3) Determination of Concentration-Dependent Viscosity Behavior

The water-based ink prepared was placed in a petri dish and concentrated by evaporating a solvent therefrom at 60° C. under reduced pressure until the concentration of the ink was reduced to 50% by mass as compared to the concentration of the ink immediately after being prepared. The resulting concentrated ink was measured for a viscosity thereof at 32° C. using a rheometer "MCR301" (equipped with a cone plate "CP50-1") available from Anton Paar GmbH. In the measurement, while the shear rate was continuously raised in the range of from 0 to 1000, the stress was measured at 9 points at the intervals of 100 of the shear rate. The thus measured stress/shear rate values were plotted and subjected to fitting by a least squares method such that the characteristic curve passes through the origin, and the gradient of the straight line was defined as a viscosity of the concentrated ink sample. The concentration-dependent viscosity behavior of the ink was evaluated according to the following evaluation ratings.

[Evaluation Ratings]

A: Viscosity of the ink when concentrated up to 50% by mass was less than 80 mPa·s.

A−: Viscosity of the ink when concentrated up to 50% by mass was not less than 80 mPa·s and less than 100 mPa·s.

B: Viscosity of the ink when concentrated up to 50% by mass was not less than 100 mPa·s and less than 200 mPa·s.

C: Viscosity of the ink when concentrated up to 50% by mass was not less than 200 mPa·s.

(4) Storage Stability of Ink

The water-based ink prepared was filled in a closed vessel and subjected to storage test in a 60° C. thermostatic chamber. After the elapse of each of 3 days, 1 week and 2 weeks, the ink was taken out from the vessel and measured for average particle size and viscosity (using an E-type viscometer) to observe the change in properties of the ink from an initial stage of the storage. The rates of change in particle size and viscosity were calculated according to the following formula (round down to the nearest decimal). The evaluation ratings are as follows.

[Evaluation Ratings]
(Average Particle Size)

Rate of Change in Particle Size(%)=|100−(average particle size after storage)/(average particle size before storage)×100|

A: Rate of change in particle size after being stored at 60° C. for 3 days was less than 10%.
A−: Rate of change in particle size after being stored at 60° C. for 3 days was not less than 10% and less than 15%.
B: Rate of change in particle size after being stored at 60° C. for 3 days was not less than 15% and less than 20%.
C: Ink had no flowability, and the measurement of an average particle size thereof was impossible.

(Viscosity)

Rate of Change in Viscosity (%)=|100−(viscosity after storage)/(viscosity before storage)×100|

A: Rate of change in viscosity after being stored at 60° C. for 3 days was less than 10%.
A−: Rate of change in viscosity after being stored at 60° C. for 3 days was not less than 10% and less than 15%.
B: Rate of change in viscosity after being stored at 60° C. for 3 days was not less than 15% and less than 20%.
C: Ink had no flowability, and the measurement of a viscosity thereof was impossible.

It was confirmed that the water-based inks obtained in Examples 4 to 6 were excellent in rub fastness and storage stability, and prevented from suffering from increase in viscosity when concentrated as compared to the water-based inks obtained in Comparative Examples 3 and 4.

The invention claimed is:

1. A water-based ink for ink-jet printing, comprising a colored fine particle dispersion, in which:
a content of water is not less than 20% by mass and not more than 60% by mass;
the colored fine particle dispersion comprises emulsified particles comprising a pigment and a polymer comprising a constitutional unit derived from a compound (A) represented by the following general formula (I) and a constitutional unit derived from a polymerizable monomer component comprising a hydrophobic vinyl-based monomer;

(I)

wherein BO is a butyleneoxy group, which is at least one group selected from the group consisting of a butane-1,2-diyloxy group, a butane-1,3-diyloxy group and a tetramethyleneoxy group; EO is an ethyleneoxy group; M is a cation; m represents an average molar number of addition of BO and is a number of not less than 1 and not more than 10; and n represents an average molar number of addition of E O and is a number of not less than 4 and not more than 25, wherein a content of the constitutional unit derived from said compound (A) is in the range 3 to 20 parts by mass in terms of the

TABLE 2

Compounding of Ink/Evaluation Results

| | | | Example 4 | Example 5 | Example 6 | Comparative Example 3 | Comparative Example 4 |
|---|---|---|---|---|---|---|---|
| Colored fine particle dispersion | | Kind | Example 1 | Example 2 | Example 3 | Comparative Example 1 | Comparative Example 2 |
| | | part(s) by mass | 13.33 | 13.33 | 13.33 | 13.33 | 3.33 |
| Propylene glycol | | part(s) by mass | 8.00 | 8.00 | 8.00 | 8.00 | 8.00 |
| 1,3-Butanediol | | part(s) by mass | 8.00 | 8.00 | 8.00 | 8.00 | 8.00 |
| "FTERGENT 215M" | | part(s) by mass | 0.20 | 0.20 | 0.20 | 0.20 | 0.20 |
| "ACETYLENOL E100" | | part(s) by mass | 0.20 | 0.20 | 0.20 | 0.20 | 0.20 |
| 1N sodium hydroxide aqueous solution | | part(s) by mass | 0.20 | 0.60 | 0.80 | 0.60 | 0.60 |
| Ion-exchanged water | | part(s) by mass | 11.07 | 10.67 | 10.47 | 10.67 | 10.67 |
| Water-based ink | Average particle size | nm | 102 | 104 | 105 | 108 | 103 |
| | Viscosity | mPa · s | 5.2 | 5.4 | 5.4 | 5.3 | 5.4 |
| | Static surface tension | mN/m | 30.1 | 29.7 | 29.7 | 27.8 | 27.8 |
| | pH | — | 8.5 | 8.6 | 8.5 | 8.5 | 8.5 |
| | Concentration-dependent viscosity*[1] | — | A−(95) | A(65) | A(55) | C(221) | B(112) |
| | Storage stability (Particle size)*[2] | — | A(1) | A(0) | A(4) | A−(13) | A(3) |
| | of ink (Viscosity)*[2] | — | A(2) | A(1) | A(3) | A−(12) | A(1) |
| Printed material | Rub fastness | — | A | A | A | A | A |

Note
*[1]Values in parentheses are actually measured values (unit: mPa · s).
*[2]Values in parentheses are calculated values (unit: %).

monomer based on 100 parts by mass of the constitutional unit derived from said polymerizable monomer component;
the polymerizable monomer component comprises an ionic monomer; and
a content of the ionic monomer in the polymerizable monomer component is not less than 2% by mass and not more than 20% by mass.

2. The water-based ink for ink-jet printing according to claim 1, wherein the emulsified particles have an average particle size of not less than 40 nm and not more than 150 nm.

3. The water-based ink for ink-jet printing according to claim 1, wherein the hydrophobic vinyl-based monomer is at least one compound selected from the group consisting of a (meth)acrylic acid ester and an aromatic ring-containing hydrophobic monomer.

4. The water-based ink for ink-jet printing according to claim 1, wherein the pigment is a pigment subjected to no hydrophilic treatment.

5. The water-based ink for ink-jet printing according to claim 1, wherein the ionic monomer is a carboxylic acid monomer.

6. The water-based ink for ink-jet printing according to claim 1, wherein the ionic monomer is at least one compound selected from the group consisting of an acrylic acid and a methacrylic acid.

7. The water-based ink for ink-jet printing according to claim 1, wherein a content of the hydrophobic monomer in the polymerizable monomer component is not less than 70% by mass and not more than 98% by mass.

8. The water-based ink for ink-jet printing according to claim 1, wherein the pigment is coated with the polymer.

9. The water-based ink for ink-jet printing according to claim 1, wherein a content of the pigment in the water-based ink is not less than 1% by mass and not more than 15% by mass.

10. The water-based ink for ink-jet printing according to claim 1, wherein a content of the polymer in the water-based ink is not less than 0.5% by mass and not more than 30% by mass.

11. The water-based ink for ink-jet printing according to claim 1, wherein the mass ratio of the pigment to the polymer [pigment/polymer] in the water-based ink is not less than 0.1 and not more than 4.0.

12. The water-based ink for ink-jet printing according to claim 1, wherein the viscosity of the water-based ink as measured at 32° C. is not less than 2.0 mPa·s and not more than 12 mPa·s.

13. The water-based ink for ink-jet printing according to claim 1, wherein the static surface tension of the water-based ink as measured at 20° C. is not less than 20 mN/m and not more than 50 mN/m.

14. A water-based ink for ink-jet printing, comprising a colored fine particle dispersion, in which:
a content of water is not less than 20% by mass and not more than 60% by mass;
the colored fine particle dispersion comprises emulsified particles comprising a pigment and a polymer comprising a constitutional unit derived from a compound (A) represented by the following general formula (I) and a constitutional unit derived from a polymerizable monomer component comprising a hydrophobic vinyl-based monomer;

wherein BO is a butyleneoxy group, which is at least one group selected from the group consisting of a butane-1,2-diyloxy group, a butane-1,3-diyloxy group and a tetramethyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25, wherein a content of the constitutional unit derived from said compound (A) is in the range 3 to 20 parts by mass in terms of the monomer based on 100 parts by mass of the constitutional unit derived from said polymerizable monomer component;
the polymerizable monomer component comprises an ionic monomer;
a content of the ionic monomer in the polymerizable monomer component is not less than 2% by mass and not more than 20% by mass; and
wherein the pH value of the water-based ink is not less than 7.0 and not more than 11.0.

15. An ink-jet printing method using the water-based ink for ink-jet printing according to claim 1, which method comprises a step of printing characters or images on a recording medium by ejecting the water-based ink.

16. The ink-jet printing method according to claim 15, wherein the water absorption of the recording medium as measured by contacting with pure water for 100 ms is not less than 0 g/m² and not more than 10 g/m².

17. The ink-jet printing method according to claim 15, wherein the recording medium is a coated paper or a synthetic resin film.

18. The ink-jet printing method according to claim 15, which further comprises a drying step of drying and heating the printed materials after the printing of the characters or images.

* * * * *